A. S. RICHARDSON.
VEHICLE TIRE.
APPLICATION FILED OCT. 25, 1912.
1,081,698.　　　　　　　　　　　Patented Dec. 16, 1913.
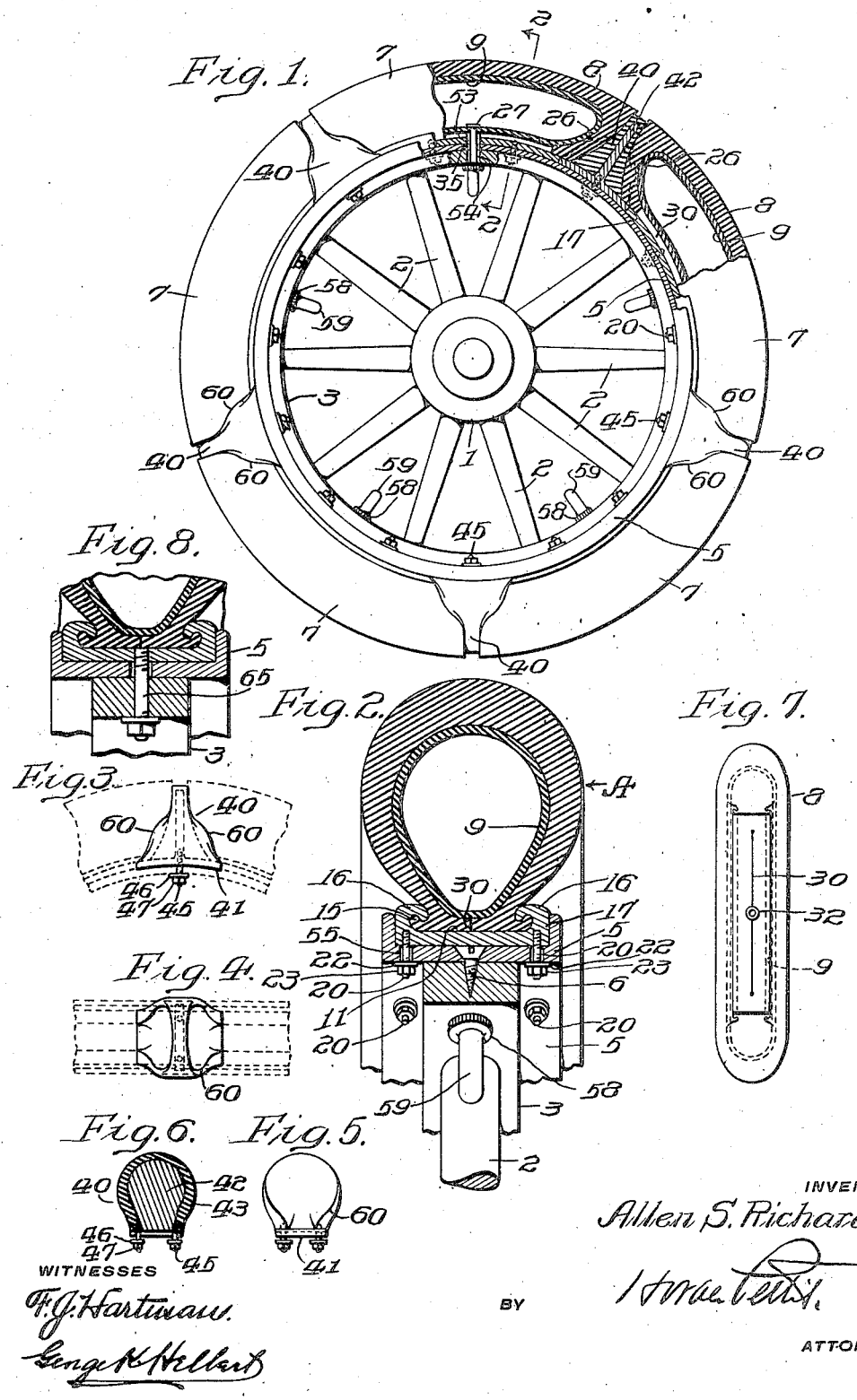
INVENTOR
Allen S. Richardson
ATTORNEY

UNITED STATES PATENT OFFICE.

ALLEN S. RICHARDSON, OF JENKINTOWN, PENNSYLVANIA.

VEHICLE-TIRE.

1,081,698.

Specification of Letters Patent.     Patented Dec. 16, 1913.

Application filed October 25, 1912. Serial No. 727,642.

*To all whom it may concern:*

Be it known that I, ALLEN S. RICHARDSON, a citizen of the United States, and a resident of Jenkintown, county of Montgomery, State of Pennsylvania, have invented certain new and useful Improvements in Vehicle-Tires, of which the following is a specification.

My invention relates to vehicle tires and especially to the kind known as pneumatic tires, and may be applied to vehicles of any type, such as automobiles, motor cycles, bicycles, wagons, or other vehicles, whether they be of the self-propelled variety, or those in which the motive power is applied from an external source.

The principal objects of my invention are to provide a tire comprising a plurality of independent removable sections, one or more of which may be independently removed when desired, without disturbing any of the other sections composing the tire; to provide a tire comprising a plurality of sections, the ends of which are separated and protected by separating means independent of the said sections; and to provide a means of securely fastening the sections as well as the separating means upon the wheel, but which will admit of the free and easy removal thereof for repair or replacement.

Other objects of my invention are to provide a sectional tire which may be readily manufactured, and which shall be as equally resilient as any form of tire at present in use; and to further provide a sectional tire in which a solid section can be substituted for a pneumatic one and vice versa without difficulty; and which can be readily attached to wheels of vehicles now adapted for the various styles of tires at present in use.

Other objects and features of my invention will appear in the following specification and the drawing forming a part of this application.

In the accompanying drawing, Figure 1 is a side elevation, partially in central longitudinal section, of a wheel carrying a tire constructed in accordance with one embodiment of this invention; Fig. 2 is a transverse section of the tire and wheel rim taken on the line 2—2 in Fig. 1; Fig. 3 is a side elevation of one of the separators which are located between the various sections of the tire, portions of which are indicated in dotted lines; Fig. 4 is a plan view of a similar separator in which portions of the sections are also shown in dotted lines; Fig. 5 is an elevation of a similar separator, looking toward one end thereof; and Fig. 6 is a central vertical transverse section thereof. Fig. 7 is a plan view of the under side of one of the tire sections; and Fig. 8 is a fragmentary transverse section similar to Fig. 2 showing a slightly modified form of construction.

Referring to the drawing, one embodiment of this invention consists of a wheel having a hub 1 from which radiate a plurality of spokes 2, which are surrounded by and affixed to the felly 3 in the ordinary manner. Around the outside periphery of the felly 3 is permanently affixed a preferably metallic rim 5 by means of the wood screws 6 or other suitable fastening means. The rim is preferably formed with a channel section, as shown in Figs. 2 and 8.

The tire proper is composed of a plurality of sections 7 of which there may be as many as desired, five being shown in the drawing. These sections are preferably constructed in a manner similar to the method now used in constructing tires for use upon vehicles similar to those to which it is desired to attach a tire embodying features of the present invention, and as shown in the drawing, may preferably be formed of an outer casing 8 having an inner tube 9. This casing may preferably be formed in the well known manner of a rubber or other covering, surrounding an interior portion composed of a strong textile fabric, although, if desired, the fabric portion may be omitted, and in the drawing it has not been shown for the sake of clearness. The ends of each of these sections are closed and are preferably constructed in a somewhat convex form, when viewed from above, or from below, as shown in Fig. 7, the corners rounding off to meet the sides of the tire, while when viewed in elevation, the form of the end is preferably similar to that shown in the sectioned portion of Fig. 1.

Each section is preferably provided at either side of its base 11 with a hook-shaped bead 15 which is formed to engage underneath the hook-shaped portions 16 of the rim or shoe 17. These shoes, of which one is provided for each section of the tire, are preferably of a cross sectional dimension to fit snugly within the channel sectioned rim 5, are of a similar curvature to such rim, and in length are preferably slightly less than the corresponding tire sections 7, as clearly shown in Fig. 1. Preferably somewhat in proximity to the ends of each of these shoes, are located two or more stud bolts 20 permanently attached to the shoe near the sides thereof, and projecting radially inward from its under side, the beads 16 being considered as on the upper side. These stud bolts are threaded for the reception of washers 22 and nuts 23 for the purpose hereinafter described. For each section of the tire, an inner tube 9, preferably made quite thin and of a high grade of rubber or similar material, is provided, the ends of which are formed in a contour similar to the contour of the inner face 26 of the ends of each of the tire sections. The tube is preferably provided with an air valve 27 vulcanized therein in the well known manner and is capable of retaining air or other fluid under pressure, when inflated through the valve 27.

Each of the tire sections 7 are preferably formed with a slot 30 in the base, as shown in Fig. 7, which slot is preferably somewhat shorter in length than the corresponding shoe 17. Through this slot 30 the inner tube 9, when in its deflated condition, can readily be inserted. The valve of the inner tube will then project radially inward from the under side of the tire section through the enlarged aperture 32 located at the center of the slot. After a tube has been inserted within a tire section, as described, the valve 27 may be passed through an aperture 35 located in the shoe 17 and preferably near its center, and the beaded edges of the outer portion of the section may then be forced under the beads 16 of the rim 17 into the position shown in Fig. 2. The inner tube may then be inflated with air or other fluid through the valve 27 by means of a pump, or other similar apparatus, to any desired pressure, and the tire section, thus inflated and attached to its corresponding shoe 17 is then ready for attachment to the rim 5 of the wheel as hereinafter described.

Located on the channel section rim 5 and symmetrically with respect to the center of the hub 1 are the separators 40, in number corresponding to the sections of the complete tire. Each of these separators is composed of a base 41 of dimensions preferably the same as those of the shoe 17, excepting that it is preferably somewhat shorter. Projecting radially outward from the outer face thereof, is a plate 42 preferably formed integral with the base and of a shape similar to that shown in Fig. 6. This plate 42 is completely surrounded and inclosed by a covering 43 which is preferably made of hard rubber, rubber composition, or other similar material, and which is formed over the plate 42 and on to the upper face of the base 41 preferably in the shape best shown in Figs. 3, 4, 5 and 6. On the under side of the base 41 are provided stud-bolts 45, preferably two in number, which are preferably situated near the sides of the base and midway between its ends, and permanently affixed in said base in a manner similar to the manner in which the stud-bolts 20 are affixed in the shoes 17 as previously described. These stud-bolts 45 are also preferably threaded for the reception of the washers 46 and nuts 47.

In assembling the tire upon the permanent rim 5 the separators 40 are first placed upon the rim in the position shown in Fig. 1, the stud bolts 45 projecting radially through suitable apertures in the rim 5, and are secured in place by tightening the nuts 47 securely against the washers 46. The various tire sections 7 are then applied in a similar manner, each of the valves 27 passing through a suitable aperture 53 in the rim 5 and through a corresponding aperture 54 in the felly 3. The stud-bolts 20 also pass through other apertures 55 in the rim 5 and project radially inward on the lower side thereof. The shoes carrying the tire sections may then be firmly secured in place upon the wheel by placing the washers 22 over the stud-bolts 20 and screwing on the nuts 23, as shown in Fig. 2. When the tire sections are thus in place, upon the rim, the inner ends of the valves 27 may, if desired, be secured in place by the lock nuts 58 and the caps 59 in the usual manner, or they may be left uncovered. Or, if desired, the valves 27 may be made of such a length that they will not project entirely through the felly 3, but will be entirely concealed in the aperture 54, in which case it is not necessary to bore the aperture 54 entirely through the felly.

It will be noted that owing to the peculiar formation of the separators 40, that portion of the ends of each of the tire sections below the widest portions thereof, as indicated approximately at A in Fig. 2, are inclosed by the lips 60 and are thus firmly secured in place, supported and protected from injury. The separators 40 are preferably made of a slightly less height than the various tire sections as shown in Fig. 1, leaving a slight indentation in the surface of the complete tire between each one of the sections, but if desired, the separators may be made of the same height as the tire sections, thus eliminating any spaces between them. Furthermore, if desired, the lips 60 may be entirely omitted, and the separators formed with a transverse section exactly similar to a transverse section of the tire sections, in which case, no portion of the sides of the tire sections will be inclosed by the separators. It is to be further noted that when all the tire sections 7 and the separators 40 are in place upon the wheel, as shown in Fig. 1, the sum of the lengths of the various shoes 17 plus the sum of the lengths of the various base plates 41 is equal to the length of the circumference of the rim 5. In other words, the shoes 17 and base plates 41 form a continuous rim around the wheel in the channel rim 5, thus greatly adding to the strength of the whole construction and tending to prevent any slipping of the tire upon the rim 5.

In Fig. 8 is shown a slightly modified form of attachment for the shoe plate 17, in which single stud-bolts 65, are employed preferably near either end of each of the shoes 17, and on the central line thereof, instead of a pair of bolts located one near each side of the shoe as shown in Fig. 2. The bolt in this case will pass completely through the felly 3 of the wheel instead of only through the channel rim 5. Of course, it will be understood that a similar method of attachment may be made use of in connection with the separators 40, if desired.

It is evident that in use, one or more sections 7 of the tire may be readily removed by removing the four nuts 23 and the washers 22, together with the lock nut 58 and the cap 59, if the latter are employed, and a new section or sections, which may be readily carried in the vehicle, substituted in place thereof without disturbing any of the other sections, or the separators. It is further evident, that to effect such substitution, it is unnecessary to jack up the car, provided the damaged section be turned so that the weight of the car is not resting thereon. After the damaged section has been so removed, it may be repaired when desired in a similar manner to that now employed for repairing the ordinary type of pneumatic tire.

It is evident that a tire constructed in the manner described, may be made with either solid or pneumatic sections 7, or with both solid and pneumatic sections. In fact, it may be considered desirable in many cases, to carry a solid section rather than a pneumatic section to be utilized in the case of wayside repairs, such solid section being as readily substituted as a pneumatic one, and it is therefore not desired to limit the invention to the specific form of tire section illustrated, but to include within the scope of the invention tires having either pneumatic, solid cushion, or other sorts of sections. Nor is it desired to limit this invention to the precise details of construction and arrangement herein set forth, as it is obvious that various modifications may be made therein without departing from the essential features of the invention as defined in the appended claims.

Having thus fully described my invention, what I claim and desire to protect by Letters Patent of the United States is:

1. The combination with a vehicle wheel having a permanent felly, of a tire comprising a plurality of elongated sections having substantially convex ends, and radially outwardly removable separators having opposite hollowed faces located between said sections and adapted to embrace the ends thereof, said sections being removable independently of said separators while said separators are in place upon said felly.

2. A vehicle tire comprising a plurality of elongated sections, shoes carrying said sections, and removable separators having opposite hollowed faces between the ends of said sections, each section being removable independently of said separators and of the other sections.

3. A vehicle tire comprising a plurality of sections, each comprising an outer casing having closed ends, an inner tube for each of said sections, means for inflating said tube, shoes carrying said sections, a channel shaped rim conformable to said shoes, outwardly removable separators embracing the ends of said sections, detachably fastened to said rim, and means for detachably fastening said sections to said rim, said separators being adapted to permit the removal of any section independently of any other section or of said separators.

4. The combination with a vehicle wheel having a permanent felly, of a tire comprising a plurality of independent sections having closed substantially convex ends, an inner tube within each of said sections, separators between said sections, each of said separators being formed with opposing hollow faces, adapted to engage and partially surround the end thereof, a plate on the base of each of said separators, a rim having a channel section permanently affixed to said felly, means for removably attaching each of said plates to said rim, and a shoe detachably fastened to each of said sections adapted to engage the ends of said plate and rest within the channel of said rim.

5. A separator for a sectional vehicle tire comprising an arc shaped plate, a reinforcing projection extending radially outward therefrom, a covering of hard rubber completely inclosing said projection and formed to receive and partially surround the end of a tire section, and attaching means extending radially outward from the other side of said plate.

6. A separator for a sectional vehicle tire comprising an arc shaped plate, a radial projecting reinforcing plate, relatively homogeneous material inclosing and surrounding the last mentioned plate, and means for attaching said separator to the rim of a wheel.

7. A separator for sectional vehicles tires comprising an arc shaped plate, a radial projecting reinforcing plate, means for detachably affixing said separator to a vehicle wheel rim, and relatively homogeneous material inclosing said last mentioned plate formed to receive the ends of a tire section.

In witness whereof, I have hereunto set my hand, this 18th day of October, A. D., 1912.

ALLEN S. RICHARDSON.

Witnesses:
ALEXANDER PARK,
GEORGE K. HELLERT.

Copies of this patent may be obtained for five cents each, by addressing the "Commissioner of Patents, Washington, D. C."